W. H. BROWN.
Utensil for Mixing and Imbibing Liquids.
No. 214,617. Patented April 22, 1879.
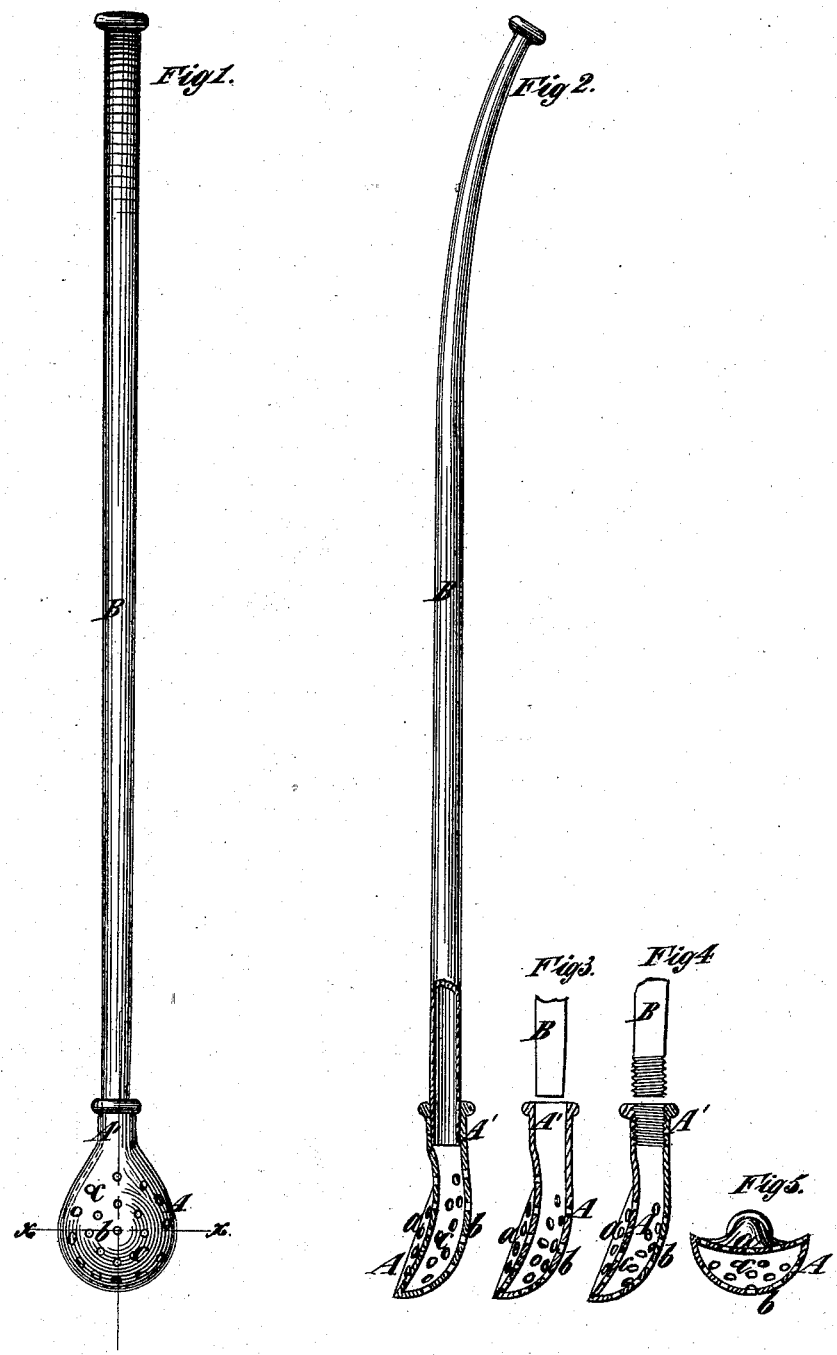

UNITED STATES PATENT OFFICE.

WILLIAM HENRY BROWN, OF WATERBURY, CONNECTICUT.

IMPROVEMENT IN UTENSILS FOR MIXING AND IMBIBING LIQUIDS.

Specification forming part of Letters Patent No. 214,617, dated April 22, 1879; application filed March 26, 1879.

*To all whom it may concern:*

Be it known that I, WILLIAM HENRY BROWN, of Waterbury, county of New Haven, and State of Connecticut, have invented a certain new and Improved Utensil for Mixing and Imbibing Liquids, of which the following is a specification.

The object of my invention is to produce a convenient article for use in mixing liquids, provided with a tube through which the same may be imbibed.

To this end the invention consists in a utensil composed of a hollow body, provided with perforations for the entrance of liquid, and a tubular stem through which liquid may be drawn. The hollow body is preferably concave upon one of its sides, to enable it to be conveniently used as a mixer or stirrer, and convex upon the opposite side, to adapt it for use in crushing various solid ingredients.

The invention also consists in various details of construction, hereinafter described and claimed.

In the accompanying drawings, Figure 1 represents a side view of a utensil embodying my improvements; Fig. 2, a partly-sectional side view taken at right angles to Fig. 1; Figs. 3 and 4, detail view illustrating two methods of uniting the hollow body and the tubular stem; and Fig. 5, a transverse section of the hollow body on the dotted line $x\,x$, Fig. 1.

Similar letters of reference designate corresponding parts in all the figures.

A designates the body of my utensil, which is hollow and preferably spoon-shaped, being concave or flat upon one side, $a$, to enable it to be used with advantage as a mixer or stirrer, and to render it applicable for use to crush solid substances—such as sugar, for instance.

I may make its opposite side, $b$, convex. It is shown as provided with perforation $c$ upon its sides, through which liquid enters the interior, and which constitutes a sieve, preventing any large particles of foreign matter entering the body of the utensil.

The body A is provided with an elongated neck, A', in which a tubular stem, B, may be inserted. This tubular stem serves as a conduit for the passage of liquid from the hollow body A to the mouth of a person drinking or imbibing liquid.

In order to facilitate the cleaning of the interior of the utensil, I preferably secure the stem B to the hollow body A, in such manner as to permit of their being readily separated and connected.

In Fig. 3 I have represented the stem B as fitting snugly within the elongated neck A', and forming a ground joint, to preclude the entrance of air. This method of connecting them permits their being quickly separated to facilitate cleaning.

If desirable, however, the stem and body may be connected by a screw-threaded joint, as represented in Fig. 4; but as the metal is cut away by a screw-thread it will be necessary in this instance to make the tube of heavier metal than that illustrated in Fig. 3.

The parts of this utensil may be plated and burnished or finished in any manner to suit the taste. This utensil is susceptible of convenient use in various ways, especially for the use of sick persons or invalids.

What I claim as my invention, and desire to secure by Letters Patent, is—

1. A utensil for mixing and imbibing liquids, consisting of a hollow perforated body, and a tubular stem connected therewith, substantially as specified.

2. A utensil for mixing and imbibing liquids, consisting of a hollow perforated body made concave upon one side, and a tubular stem connected therewith, substantially as and for the purpose specified.

3. A utensil for mixing and imbibing liquids, consisting of a hollow perforated spoon-shaped body and a tubular stem connected therewith, substantially as and for the purpose specified.

4. A utensil for mixing and imbibing liquids, consisting of a hollow perforated body and a tubular stem detachably connected therewith, substantially as and for the purpose specified.

WM. HENRY BROWN.

Witnesses:
 JNO. J. THORNE,
 H. C. WINTRINGHAM.